United States Patent
Cheng

(10) Patent No.: US 10,475,309 B1
(45) Date of Patent: Nov. 12, 2019

(54) OPERATION METHOD OF SMART WARNING DEVICE FOR SECURITY

(71) Applicant: Sray-Tech LTD., Taipei (TW)

(72) Inventor: Hsun-Yu Cheng, Keelung (TW)

(73) Assignee: SRAY-TECH IMAGE CO., LTD., Taipei (TW)

(*) Notice: Subject to any disclaimer, the term of this patent is extended or adjusted under 35 U.S.C. 154(b) by 0 days.

(21) Appl. No.: 16/143,477

(22) Filed: Sep. 27, 2018

Related U.S. Application Data

(60) Provisional application No. 62/683,027, filed on Jun. 11, 2018.

(51) Int. Cl.
*G08B 13/19* (2006.01)
*G06K 9/00* (2006.01)

(52) U.S. Cl.
CPC ......... *G08B 13/19* (2013.01); *G06K 9/00255* (2013.01); *G06K 9/00281* (2013.01)

(58) Field of Classification Search
None
See application file for complete search history.

(56) References Cited

U.S. PATENT DOCUMENTS

| | | | | |
|---|---|---|---|---|
| 7,305,108 B2 * | 12/2007 | Waehner | ............ | G06K 9/00221 340/5.53 |
| 2014/0201844 A1 * | 7/2014 | Buck | ........................ | G06F 21/50 726/26 |
| 2015/0062089 A1 * | 3/2015 | Howard | ................. | G06F 1/1605 345/175 |
| 2015/0356351 A1 * | 12/2015 | Saylor | ..................... | G01S 17/89 348/164 |

FOREIGN PATENT DOCUMENTS

| | | |
|---|---|---|
| CN | 1979575 A | 6/2007 |
| CN | 105632058 A | 6/2016 |
| CN | 106059868 A | 10/2016 |
| TW | 201819952 A | 6/2018 |
| WO | 2016/082253 A1 | 6/2016 |

OTHER PUBLICATIONS

Wang, Hsiang-Jung (Kainan University), Thesis: Multi-pose Face Recognition Using an Enhanced 3D Face Modeling, Jun. 2016.

* cited by examiner

*Primary Examiner* — Thomas S McCormack
(74) *Attorney, Agent, or Firm* — Winston Hsu

(57) ABSTRACT

A three-dimension (3D) sensor disposed in a static space, the 3D sensor emits a first infrared light when initially turned on, the first infrared light is reflected by the static space, and then received by the 3D sensor and recorded as a first signal. Next, the 3D sensor emits an infrared light in every interval times, and the infrared light will be reflected by static space each time. The reflected feedback signals are recorded and are sequentially compared to the first signal. When the feedback signal is equal to the first signal, the 3D sensor continues to operate, and when a human body enters the static space, causing the feedback signal to be different from the first signal, the 3D sensor identifies the human body to get an identified information, and comparing the identified information with an authentication database saved the 3D sensor.

9 Claims, 4 Drawing Sheets

US 10,475,309 B1

OPERATION METHOD OF SMART WARNING DEVICE FOR SECURITY

CROSS REFERENCE TO RELATED APPLICATIONS

This application claims the benefit of U.S. Provisional Application No. 62/683,027, filed on Jun. 11, 2018 and entitled "Smart Objects Motion Detection", the contents of which are incorporated herein.

BACKGROUND OF THE INVENTION

1. Field of the Invention

The present invention relates to the field of optics, and more particularly to the operation and application method of a security warning system including a 3D sensor.

2. Description of the Prior Art

As technology advances, machines are gradually replacing human resources and are used in all fields of life. On the other hand, for the security warning system, the current technology has reached that when the camera detects that the person appears within a certain range, the warning can be automatically issued to notify the user.

The passive infrared sensor (PIR sensor), which is widely used in security warning systems, still has some shortcomings. For example, the PIR sensor can only detect whether an object passes through the detecting range, but cannot specifically detect whether the object is a human, an animal, or another movable object. Even if the PIR sensor can be used with a camera, the camera is easily to be affected by ambient light, and in an environment that is too bright or too dark, the screen is unclear. Therefore, the existing smart security warning systems still has room for improvement.

SUMMARY OF THE INVENTION

The present invention provides a method of operating a smart security warning device. Firstly, a three-dimension (3D) sensor is provided in a static space, wherein the 3D sensor emits a first infrared light when initially turned on, and the first infrared light is reflected by the static space, and the reflected first infrared light is fed back to the 3D sensor and record as a first signal. Next, the 3D sensor emits an infrared light in every interval times, and each infrared light will be reflected by the static space, each reflected infrared light is defined as a feedback signal, wherein each feedback signal is recorded and is sequentially compared to the first signal. When the feedback signal is equal to the first signal, the 3D sensor continues to operate, and when a human body enters the static space, causing the feedback signal to be different from the first signal, the 3D sensor identifies the human body to get an identified information, and comparing the identified information with an authentication database saved in the 3D sensor.

The invention is characterized in that a method of applying a 3D sensor to a smart security warning system is provided. The 3D sensor emits infrared light in a timed intermittent manner to prevent the infrared light from being continuously turned on, thereby achieving power saving function. In addition, in an environment that is too bright or too dark, for determining whether an object is a human body or not, the accuracy of the 3D sensor is significantly better than the accuracy of the conventional camera, reducing the possibility of false warnings by non-human bodies (such as small animals). Therefore, the protection safety of the smart security warning system can be further improved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
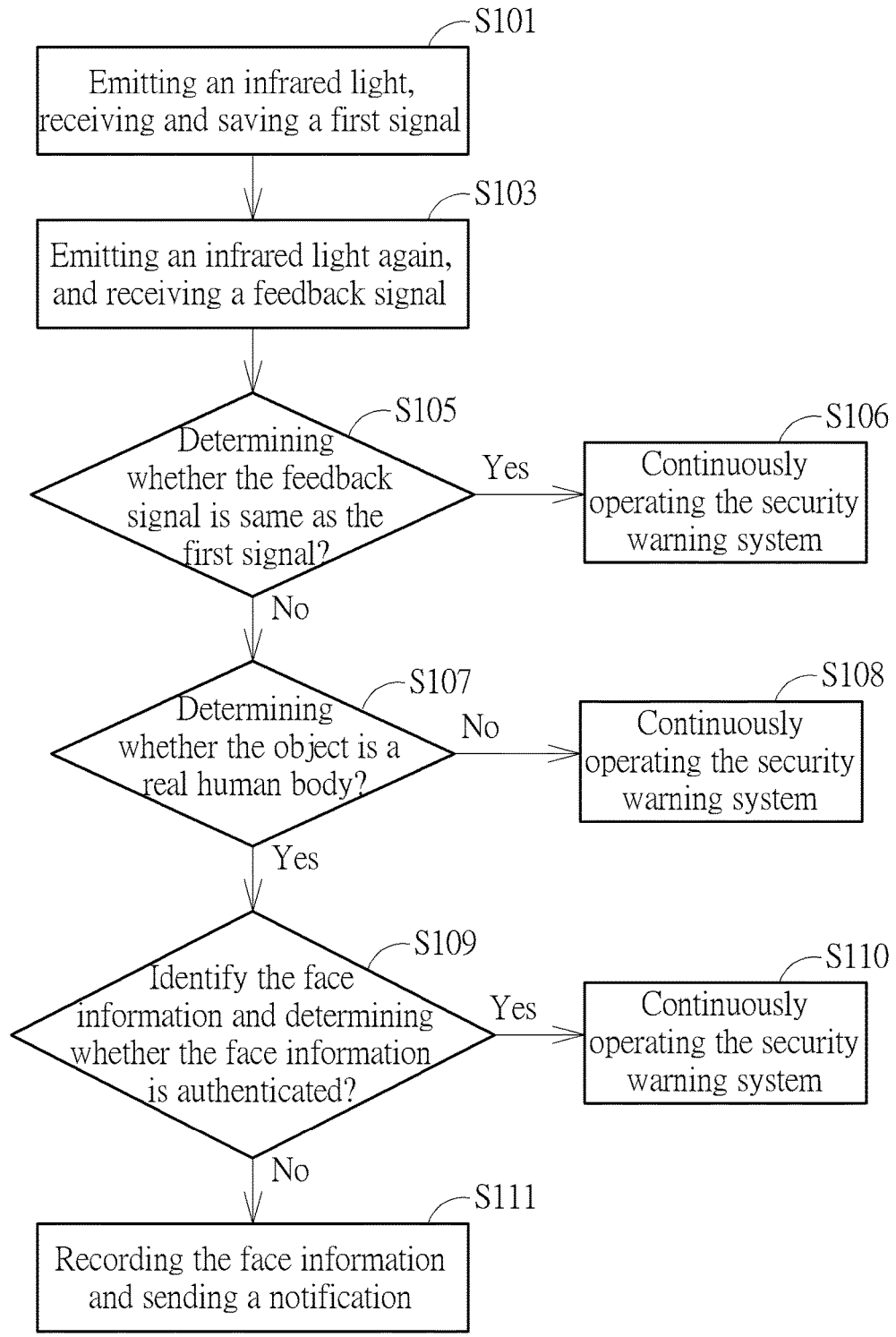
FIG. 1 is a schematic diagram showing the operation of the smart security warning system of the present invention.
Figure 2:
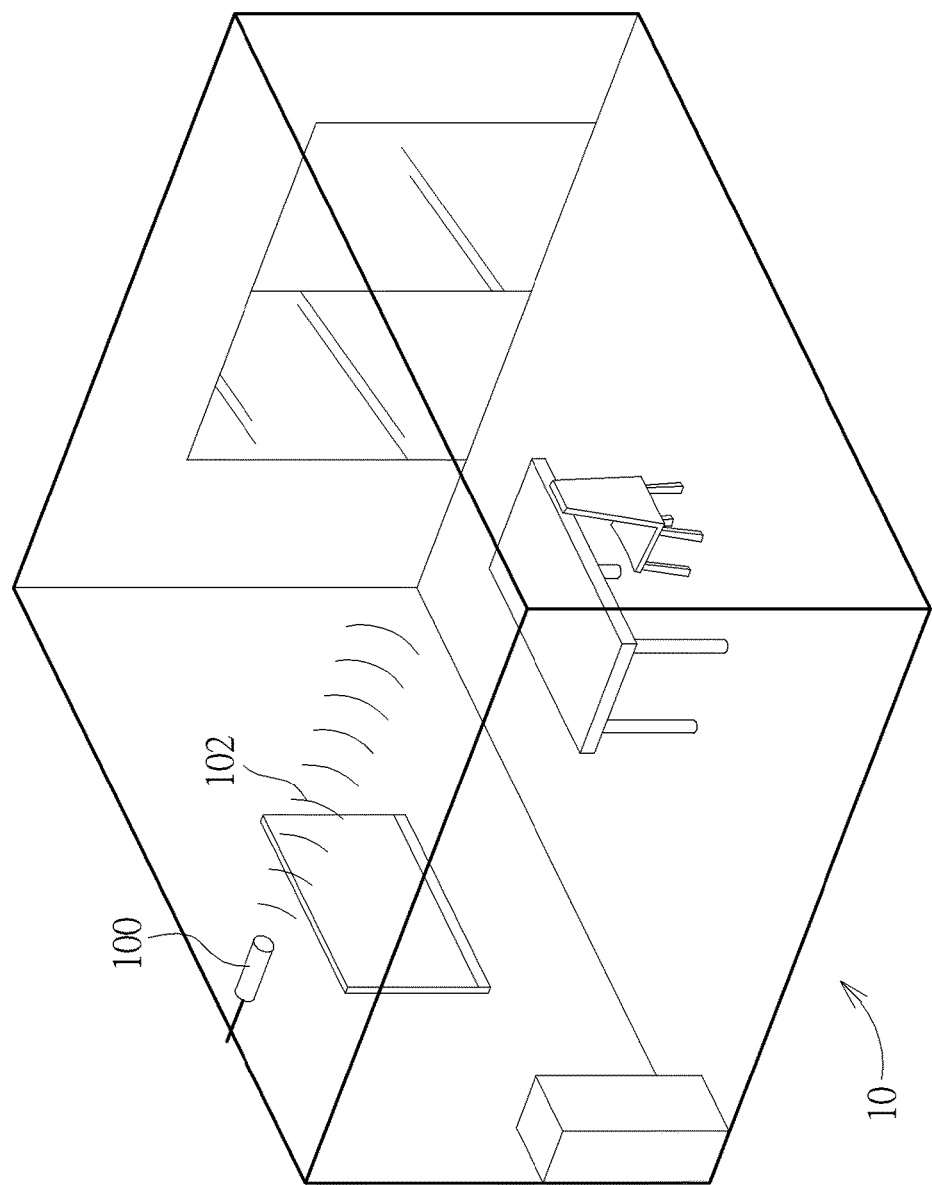
FIG. 2 and FIG. 3 illustrate a practical application schematic diagram of the smart security warning system of the present invention.
Figure 3:
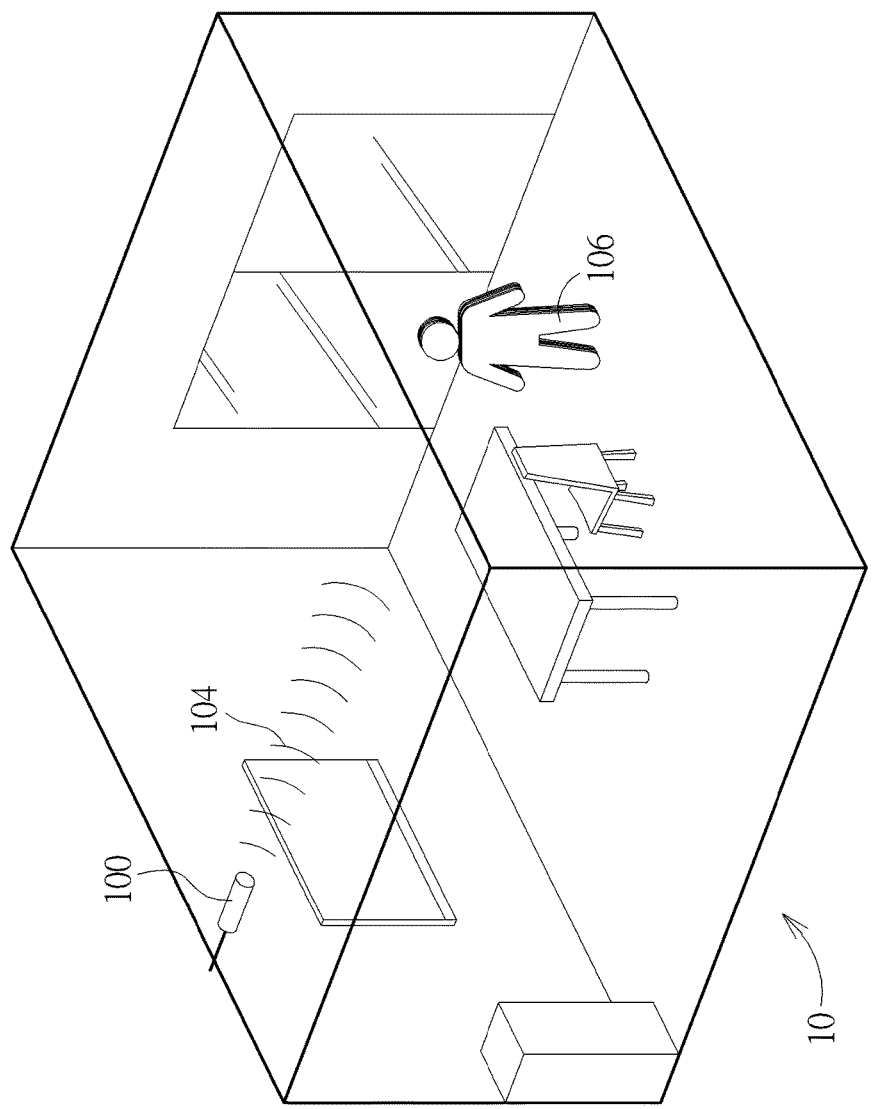

Please refer to FIG. 1 to FIG. 3, FIG. 1 is a schematic diagram showing the operation of the smart security warning system of the present invention, and FIGS. 2 and 3 are schematic diagrams showing the actual application of the smart security warning system of the present invention. As shown in FIG. 2 and FIG. 3, the smart security warning system of the present invention includes at least one three-dimension (3D) sensor 100 disposed in a static space 10. The static space 10 described herein refers to an environment in which no personnel enters and exits under normal conditions when the smart security warning system is activated, such as a home environment when nobody at home, or a store that is not in business hours.

The 3D sensor 100 described herein includes a sensor having a detecting function and feeding back a stereoscopic contour or depth of the detected object. In view of the current technology, the 3D sensor 100 may include several devices, such as: 1. The active stereo vision device, the principle of which is to simulate the two eyes of the human body, assisted by a specific pattern light source. The image of the target object is captured by two cameras to calculate the depth of the target object. 2. The structured light device, the principle of which is based on emitting a specific pattern light source. After the light source is reflected by the object, the changing of the pattern light source is calculated, and then analyze the surface contour and the depth of the object. 3. The time of flight (TOF) device, the principle is to emit infrared light, and simultaneously receive the reflected infrared light, calculate the distance of the target by measuring the time difference. Regarding the above three 3D sensor devices, which are known in the art, and the detailed technical contents will not be further described herein. In addition, the present invention is not limited to use the three different 3D sensors devices mentioned above, and other sensors capable of detecting stereoscopic information such as object depth or contour can also be applied to the present invention.

At present, the 3D sensor is usually applied to the face recognition function of a mobile phone or an electronic device. However, the 3D sensor consumes more power than a camera or a PIR sensor, so it is not suitable for a smart security warning system that needs to be turned on for a long time. Please refer to step S101 of FIG. 1 and FIG. 2, one feature of the present invention is that when the smart security warning system is turned on, an infrared light 102 is emitted firstly, the infrared light 102 may be an infrared light of wavelength of 940 nm or a an infrared light of wavelength of 850 nm. In this embodiment, taking infrared light with wavelength of 940 nm as an example, it has the advantage that are not easily affected by ambient light, but the present invention may also use infrared light of other wavelengths, or even other kinds of light sources to instead the infrared light (such as visible light). After the infrared light 102 is reflected by the static space 10, the infrared light 102 is received by the 3D sensor 100 to obtain a first signal, and the first signal is saved in a system (not shown) connected to the 3D sensor 100. The system may be a computer hardware system or a cloud storage space. The information represented by the first signal may indicate the initial state of the static space 10. In other words, as shown in FIG. 2, the first signal indicates the information that the emitted infrared light 102 is reflected by the initial static space 10 (usually, the initial static space 10 means no one exists in the static space 10).

Here, the first signal will be recorded in the system as a reference value. In the subsequent steps, as shown in step S103, step S105 of FIG. 1 and FIG. 3, the 3D sensor 100 emits the infrared light 104 in every interval times, and receives the information of the infrared light 104 reflected by the static space 10. For example, the infrared lights can be emitted at different time intervals according to user requirements, the time interval may be several seconds (for example, infrared light 104 is emitted every three seconds), or several minutes (for example, every 10 minutes, that is, 600 seconds). According to this operation mode, the infrared light of the 3D sensor 100 can be prevented from continuously turning on, to achieve the power saving requirement.

After the infrared light 104 is reflected by the static space 10, it will be received by the 3D sensor 100. Here, the information of the reflected infrared light 104 is defined as a feedback signal, and the above system (for example, a computer system) compares the feedback signal with the first signal, for example, compares the difference between the total infrared light amount of the first signal between the total infrared light amount of the feedback signal, or determines whether the feedback signal detects additional object appearing. For example, if the total infrared light amount of the first signal and the total infrared light amount of the feedback signal are the same, it means that there is no additional object appearing or reducing in the static space 10, and no object is moved, so it can be determined as a safe state, and the smart security warning system will continue to operate (step S106).

When the result of the comparison of the feedback signal with the first signal is different, it may represent that an object may be moved or an additional object appears in the static space 10. For example, as shown in FIG. 1 and FIG. 3, assume that a person 106 appears in the static space 10, causing a difference between the feedback signal and the first signal (e.g., the difference in the total infrared light amount, which will be further described in the following paragraph). At this time, the 3D sensor 100 can receive the information of the object, and determine whether the person 106 is a real human body or other animal or the like by a limb movement or the like (step S107). It should be noted that, as described above, the 3D sensor 10 can determine the contour or depth information of the object, and thus is used to determine whether an object is a real human body, especially in an environment that is too bright or too dark. The accuracy of the 3D sensor for determining an object is significantly better than the accuracy of the conventional camera for determining an object. If the 3D sensor determines the object is not a real human body, the system continues to operate (as shown in step S108). On the other hand, if the 3D sensor determines the object is a real human body, as shown in step S109, when the person 106 is sufficiently close to the 3D sensor 100, the 3D sensor 100 can capture the facial information of the person 106, such as a facial contour and he like to identify the person. If the face information has been authenticated (for example, a household or a store owner, etc.), as shown in step S110, it can be determined in a safe state, the smart security warning system will continue to operate, or to execute other commands, for example, to open a specific door lock, or to disarming the smart security warning system. When the face information is not authenticated, as shown in step S111, the system will record the face information and sends a notification, such as notifying the user or sounding an warning.

Figure 4:
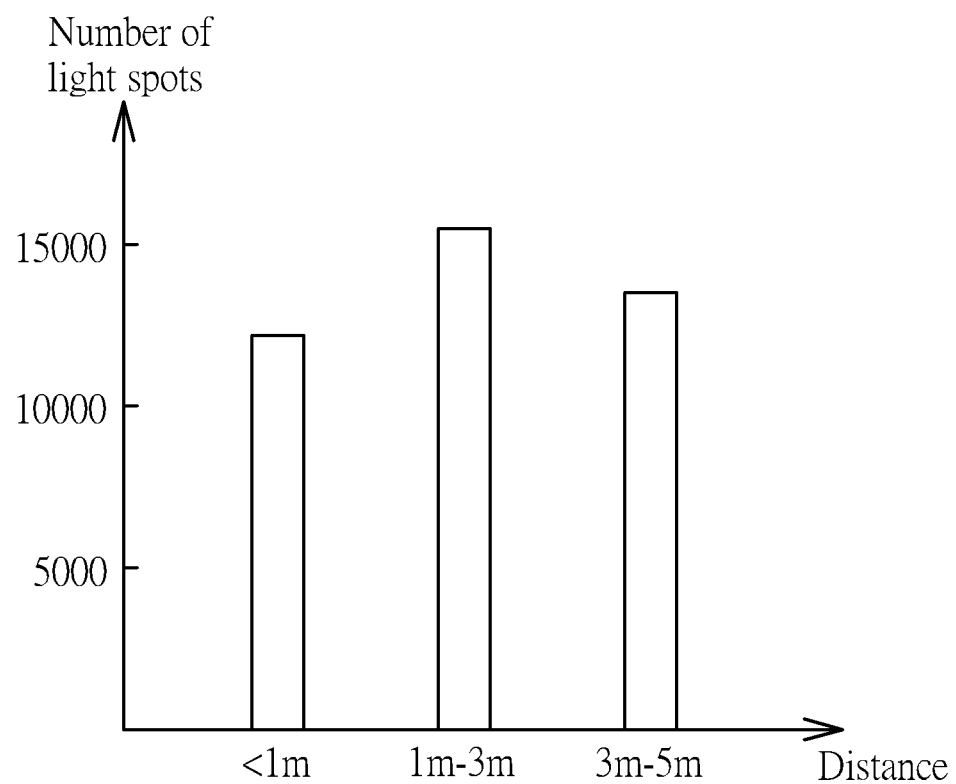
FIG. 4 is a histogram showing the total infrared light amount received by the 3D sensor of the present invention.

Regarding the method for comparing the difference between the feedback signal and the first signal in the present invention, please refer to FIG. 4, which illustrates the histogram indicating the total infrared light amount of the present invention. As shown in FIG. 4, taking the 3D sensor 100 as a structured light device, a certain number (for example, thousands or tens of thousands) of light spots will be emitted to the static space 10, and when the objects in the static space 10 are not moving, the number of the reflected light spots received by the 3D sensor 100 should be a fixed number (or only tolerate a small error, for example, the errorless than 2%, but is not limited thereto). In FIG. 4, by determining the intensity of the received reflected light spots, the distances between the objects and the 3D sensor 100 can be judged, and different areas (for example, within 1 meter, 1 meter to 3 meters, 3 meters to 5 meters, or the like) are indicated in a histogram according to different distances. When the number of reflected spots received in a certain distance changes (i.e., the number of the light spots increases significantly), for example, the number of the light spots increases more than 10%, it can be determined that there may one or more objects appear in the area, and the smart security warning system can perform further detect this area (such as determining whether the object is a real human body or detecting the facial information). It can be understood that the 3D sensor 100 is exemplified by a structured light device. However, the present invention is not limited thereto, if the 3D sensor 100 is another type of device (for example, a TOF device), the difference between the first signal and the feedback signal can be compared according to the similar method.

In the present invention, the 3D sensor 100 is preferably located near the entrance and exit of the static space 10, so that when a person enters and exits, the face of the person is relatively close to the 3D sensor 100, which can be more accurately determine the face information. However, the present invention is not limited thereto. In other embodiments, the 3D sensor 100 may also be disposed toward an open space (for example, toward the living room), so that the detection range of the 3D sensor 100 may be expanded. Or in other embodiments, a plurality of 3D sensors 100 may be provided, which are also within the scope of the present invention.

In summary, the invention is characterized in that a method of applying a 3D sensor to a smart security warning system is provided. The 3D sensor emits infrared light in a timed intermittent manner to prevent the infrared light from being continuously turned on, thereby achieving power saving function. In addition, in an environment that is too bright or too dark, for determining whether an object is a human body or not, the accuracy of the 3D sensor is significantly better than the accuracy of the conventional camera, reducing the possibility of false warnings by non-human bodies (such as small animals). Therefore, the protection safety of the smart security warning system can be further improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating a smart security warning device, comprising:
   providing a three-dimension (3D) sensor in a static space, wherein the 3D sensor emits a first infrared light when initially turned on, and the first infrared light is reflected by the static space, and the reflected first infrared light is fed back to the 3D sensor and record as a first signal;
   the 3D sensor emitting an infrared light in every interval times, and each infrared light will be reflected by the static space, each reflected infrared light is defined as a feedback signal, wherein each feedback signal is recorded and is sequentially compared to the first signal, wherein during the step for comparing each feedback signal with the first signal, a total infrared light amount of the feedback signal is compared with a total infrared light amount of the first signal;
   when the feedback signal is equal to the first signal, the 3D sensor continues to operate; and
   when a human body enters the static space, causing the feedback signal to be different from the first signal, the 3D sensor identifies the human body to get an identified information, and comparing the identified information with an authentication database saved in the 3D sensor.

2. The method of operating a smart security warning device of claim 1, wherein the identified information comprises a face information.

3. The method of operating a smart security warning device of claim 2, wherein the identified information is compared with the authentication database saved in the 3D sensor, and when a comparing result is matched, the 3D sensor continues to operate.

4. The method of operating a smart security warning device of claim 2, wherein the identified information is compared with the authentication database saved in the 3D sensor, and when a comparing result is not matched, the identified information is recorded and the 3D sensor sends a notification.

5. The method of operating a smart security warning device of claim 1, wherein the first infrared light and the infrared light have a wavelength of 850 nanometers (nm) or 940 nm.

6. The method of operating a smart security warning device of claim 1, wherein the 3D sensor emits an infrared light in every interval times, and the interval times is between 3 seconds and 600 seconds.

7. The method of operating a smart security warning device of claim 1, wherein during the step for comparing each feedback signal with the first signal, further comprising determining whether the human body enters the static space or not.

8. The method of operating a smart security warning device of claim 1, wherein the 3D sensor comprises an active stereo vision device, a structured light device or a time of flight (TOF) device.

9. The method of operating a smart security warning device of claim 1, further comprising a step of determining whether the human body is a real human body.

* * * * *